Patented July 4, 1939

2,164,359

UNITED STATES PATENT OFFICE 2,164,359

ADHESIVE TAPE

Clauss Burkart Strauch, New York, N. Y., assignor to Minnesota Mining & Manufacturing Company, St. Paul, Minn., a corporation of Delaware No Drawing. Application May 18, 1936, Serial No. 80,409

16 Claims. (Cl. 91—68)

This application is a continuation in part of my co-pending applications Serial No. 9,588 filed March 6, 1935, and Serial No. 54,455 filed December 14, 1935, and Serial No. 65,807 filed February 26, 1936.

The present invention relates to adhesive materials generally, and more particularly to such materials in sheeted form, and finds a field of particular utility in the field of adhesive tape or strips, and further relates to means and methods of producing such material in its various phases.

The invention provides adhesive sheets having adhesive coatings which are normally pressure-sensitive but highly cohesive.

This invention also relates to improvements in rubber compositions and modifications of rubber generally, and more particularly to halogenated rubber, of which chlorinated rubber is an example.

The invention further relates to plasticized materials and improved means and methods of plasticizing.

Among the objects of the invention are the production of an adhesive tape characterized by improved qualities of adhesion; the production of an adhesive tape characterized by marked longevity of predetermined adhesive qualities; the production of an adhesive tape characterized by noteworthy qualities of cohesion in the adhesive; the production of an improved tape suitable not only for adhesive purposes generally but also for medical and surgical uses and one characterized by being non-irritating or otherwise hurtful to the human skin; the production of an improved surgical tape characterized by its qualities of permitting inspection of the underlying surface and concurrently being inconspicuous; the provision of an improved method of making adhesive material which is adapted for the production of sheeted material; the provision of such a method which is characterized by facility, rapidity and inexpensiveness in such production and which is further characterized by the fact that it may be carried out without the provision of machinery which is either expensive or complex in structure or operation; the provision of an improved method of making adhesive solutions characterized by the employment of relatively small quantities of solvent; the provision of adhesives having preferential adhesive qualities in respect of predetermined surfaces, together with such other and further objects as will appear as the description of the invention proceeds.

In attaining the foregoing objects, together with such further benefits and advantages as may hereinafter appear, I preferably employ chlorinated rubber which may conveniently be that known in the market under the trade-name of "Tornesit" of the type identified as 500 centipoise viscosity and possessing the physical properties of the "Tornesit" produced in the United States by Hercules Powder Company of Wilmington, Delaware; as plasticizers for the chlorinated rubber I preferably employ such materials as castor oil, dibutyl-phthalate, or butyl stearate, depending upon the characteristics desired to be present in the product; and as a solvent I preferably employ such a material as butyl acetate.

In forming sheeted adhesives comprising a backing provided with a normally pressure-sensitive adhesive coating imposed on at least a portion of one surface thereof, I employ any suitable backing but preferably cellulose acetate in case of material to be formed into tape for medico-surgical uses. The cellulose acetate employed should be plasticized adequately and to a degree suitable for the contemplated use of the tape, and the plasticizer used in plasticizing the cellulose acetate should be selected not only with a view to the prospective use of the tape but also should be compatible with the plasticizer employed in the adhesive.

For certain purposes where such relatively expensive materials as cellulose acetate are not required I may advantageously employ as a backing such cellulosic materials as those sold in the United States by Dupont Cellophane Company under the trade-name of "Cellophane".

While I have additionally found that various other cellulosic materials (fibrous and non-fibrous) may be employed as a backing, I have further found that various non-cellulosic materials may likewise be advantageously employed as backing materials, such for example, as the synthetic resinous material sold in the United States by Carbide & Carbon Chemicals Corporation under the trade-name of "Vinylite", and as the rubber hydrochloride material sold in the United States by Goodyear Tire & Rubber Company under the trade-name of "Pliofilm".

As this specification proceeds it will be observed that while all of the plasticizers referred to are useful and that while I have purposefully set forth what I believe to be the preferred solvent nevertheless the particular plasticizer employed and the solvent utilized are chosen with reference to the particular backing employed to the end that the most effective result may be attained with respect to the object sought to be accomplished as well as the avoidance of any chemical or physical incompatibility.

In the case of a cellulose acetate properly selected as above indicated I have found that a composition of the following ingredients which for simplification I shall term Formula A is useful, thus—

Formula A

Tornesit _____ 1600 grams
Castor oil _____ 3600 c. c.
Butyl acetate _____ 2000 c. c.

This Formula A may be varied within certain limits which may generally be indicated approximately as follows:

Tornesit_____ 1600 grams
Castor oil_____ from 2400 to 4800 c. c.
Butyl acetate____ Quantum sufficient to give desired viscosity as well as blending depending upon the degree of hardness or softness desired.

Care should be exercised on the one hand to insure a sufficient quantity of plasticizer to avoid inoperativeness on account of lack of normally pressure-sensitive adhesive qualities, and on the other hand the amount of the plasticizer employed should be controlled to a point where assurance is had against loss of cohesion in the adhesive, to-wit: any undesirable off-setting of the adhesive on the object to which it is applied or other undesirable phenomena such as any stringiness in the adhesive which might affect its proper functioning.

In the case of a film of regenerated cellulose, properly selected as above indicated, I have found that a composition of the following ingredients, which for simplification I shall term Formula B is useful, thus—

Formula B

Tornesit _____ 1600 grams
Dibutyl phthalate_____ 1600 c. c.
Butyl acetate_____ 2000 c. c.

This formula B may be varied within certain limits which may generally be indicated approximately as follows:

Tornesit_____ 1600 grams
Dibutyl phthalate_____ 1000 to 2800 c. c.
Butyl acetate____ Quantum sufficient to give desired viscosity as well as blending depending upon the degree of hardness or softness desired.

The same care as to quantity of plasticizer to be employed, should be exercised, as indicated under Formula A for the reasons there specified.

Where regenerated cellulose in the form of "Cellophane" is used by me, it is preferred to use so-called normal or uncoated "Cellophane" free from the moisture-proofing coating known by me to be applied to such sheeting at this time.

In the case of films of rubber derivatives, properly selected as above indicated. I have found that a composition of the following ingredients which for simplification I shall term Formula C is useful, thus—

Formula C

Tornesit _____ 1600 grams
Butyl stearate _____ 2000 c. c.
Butyl acetate _____ 2000 c. c.

This Formula C may be varied within certain limits which may generally be indicated approximately as follows:

Tornesit_____ 1600 grams
Butyl stearate____ 1000 to 2800 c. c.
Butyl acetate____ Quantum sufficient to give desired viscosity as well as blending depending upon the degree of hardness or softness desired.

The same care as to quantity of plasticizer to be employed, should be exercised, as indicated under Formula A for the reasons there specified.

Those skilled in the art will recognize from the examples given above that care should be taken to use a material as a solvent which will act upon both the halogenated rubber and the plasticizer where such combined action is of benefit.

In my practice of the present invention I have found it convenient to make use of plasticizers in a liquid form, and I have further found it desirable to mix the Tornesite into the liquid plasticizer. While this may be relatively rapidly accomplished at normal temperatures, the operation may be accelerated by the application of heat within limits beyond which there is a harmful change of state or of phase of the materials employed. The mass thus produced is then subjected to the progressive addition of small amounts of the solvent.

The described procedure may be readily carried out by means of any suitable simple mixing implements or machines whereby the materials may be blended, and, within my experience it is of importance to observe preferred sequence of steps in order to expedite the mixing operation.

While I have set forth above certain specific exemplifications of my invention, it should be understood that these exemplifications are given for the purpose of illustration of the use of the invention in several of its aspects but are not to be taken in any sense as in limitation of the scope of the invention.

Those skilled in the art will appreciate that the examples shown in connection with the three formulae lettered A B and C epitomize a multiplicity of combinations, and that within the disclosures made by me, various other desirable combinations not specifically set forth may be readily accomplished and are to be included within the ambit of this invention.

It will be equally apparent from the foregoing that the Tornesit can be directed in its affinity toward the backing by selection of the plasticizer. This enables me to produce not only an adhesive having very marked cohesion per se, including resistance to off-setting, tearing or shredding, but also one that has very marked adhesion to the backing to which it is applied. These phenomena in turn produce certain markedly desirable results, among which are that I am enabled to utilize the adhesive by direct application thereof to the backing without the interposition of any priming coat on the backing, and at the same time a wide range of slip-sheetings are available in case the nature of the adhesive composition or of the backing, or of the inter-relation of the adhesive and the backing, be such that slip-sheeting is requisite or convenient.

It is also apparent from the foregoing description and from the ingredients used that the benefit of a rapidly drying adhesive is obtained. The benefit is responsible in considerable measure for the ease and economical production of my invention inasmuch as I am enabled to dispense with the time and equipment ordinarily employed in driving off the excessive amounts of solvents and properly firming the adhesive for handling and use.

It will further be observed that in evaporating the solvent hereinabove disclosed by me neither are any poisonous fumes given off nor do any toxic or otherwise hurtful residues remain.

By Tornesite 500 centipoise viscosity as used herein, it is understood that this product is chlorinated rubber containing approximately 66% chlorine and is preferred to be used because of its age-resisting properties, i. e., functional longevity. Lower viscosities with the same degree of chlorination or lower degrees of chlorination may be used with some degree of sacrifice of the age-resisting characteristics.

Resins natural and artificial may be added to the formulae above mentioned. Of the natural resins or compounds thereof, rosin, ester gums, dammar, abalyn (methyl ester of abietic acid), Hercolyn (hydrogenated methyl ester of abietic acid), are examples. Of the synthetic resins, the following may be mentioned: Arochlor (chlorinated diphenyl resin), Vinylite (a vinyl compound), Santolite (a condensation product of sulphonamide and formaldehyde) R & H 35 (a hydrocarbon resin).

These resinous materials may be added in varying proportions and the selection of these resins will be dependent upon the particular plasticizer chosen for combination with the chlorinated rubber.

The addition of these resinous materials will thereupon modify the entire mass, adding properties respectively peculiar to these additional materials.

It will be observed that I have thus been able to achieve the production of pressure-sensitive adhesives and adhesive tapes distinguishing over products known to me in that the components of my improved product and the combination of components entering into their production are characterized by resistance to aging of the components and combination of components in the final product.

In the production of the final adhesive layer or film as contemplated by me, I have described a range of plasticizers which is chosen in accordance with the use to which the adhesive is to be applied in the adhesive relationship to be compatible with the backing. Decrease in the quantity of plasticizer decreases the tackiness of the end product and to the degree of plasticizer or tack-producing activity of the plasticizer. An increase of the plasticizer and the plasticizer tack-producing activity of the same increases the tackiness of the end product. The ranges given and the particular plasticizers given are not to be considered restrictive but variation may be made with the particular tack producing activity of the plasticizer and the end product desired. The particular plasticizers, however, are desirable beyond mere plasticizing action, in that a relationship of unexpected adhesive and cohesive properties is thereby obtained which is exceedingly desirable in the production of adhesive tapes for the purposes herein specifically described, i. e., normally pressure-sensitive adhesive.

Having thus described my invention and illustrated its use what I claim as new and desire to secure by Letters Patent is:

1. As a new article of manufacture, an adhesive tape or the like, comprising in combination a backing and an adhesive thereon including halogenated rubber plasticized by a tack-producing plasticizer which is compatible to said backing and is in proportion such that the adhesive is normally tacky, pressure-sensitive and cohesive.

2. As a new article of manufacture, an adhesive tape or the like, comprising in combination a backing and a cohesive normally pressure sensitive adhesive thereon comprising plasticized halogenated rubber.

3. As a new article of manufacture, pressure sensitive adhesive tape or the like which comprises a backing provided with an adhesive including chlorinated rubber plasticized by means of castor oil in proportion such that the adhesive is normally tacky, pressure-sensitive and cohesive.

4. As a new article of manufacture, pressure sensitive adhesive tape or the like which comprises a backing provided with an adhesive including chlorinated rubber plasticized by means of dibutyl phthalate in proportion such that the adhesive is normally tacky, pressure-sensitive and cohesive.

5. As a new article of manufacture, pressure sensitive adhesive tape or the like which comprises a backing provided with an adhesive including chlorinated rubber plasticized by means of butyl stearate in proportion such that the adhesive is normally tacky, pressure-sensitive and cohesive.

6. As a new article of manufacture, pressure sensitive adhesive tape or the like which comprises a backing of cellulose acetate provided with an adhesive including chlorinated rubber plasticized by means of castor oil in proportion such that the adhesive is normally tacky, pressure-sensitive and cohesive.

7. As a new article of manufacture, pressure sensitive adhesive tape or the like which comprises a backing of regenerated cellulose provided with an adhesive including chlorinated rubber plasticized by means of dibutyl phthalate in proportion such that the adhesive is normally tacky, pressure-sensitive and cohesive.

8. As a new article of manufacture, pressure sensitive adhesive tape or the like which comprises a backing of a rubber hydrochloride provided with an adhesive including chlorinated rubber plasticized by means of butyl stearate in proportion such that the adhesive is normally tacky, pressure-sensitive and cohesive.

9. The method of making an adhesive article which includes the steps of mixing a halogenated rubber and a tack-producing plasticizer in proportions to form a normally tacky and pressure sensitive cohesive adhesive and then adding a solvent selected for compatibility with the materials of the adhesive and the backing to which the adhesive is to be applied and then applying the adhesive solution thus formed to a backing and evaporating the solvent.

10. As a new article of manufacture, a pressure sensitive adhesive tape or the like which comprises a backing of the group of cellulose acetate, regenerated cellulose, and rubber hydrochloride provided with a cohesive pressure sensitive adhesive including halogenated rubber and a plasticizer which is compatible to said halogenated rubber and said backing.

11. As a new article of manufacture, a pressure sensitive adhesive tape or the like comprising a backing of cellulose acetate provided with a normally pressure-sensitive adhesive including chlorinated rubber in an amount of about 25-40% by weight and castor oil in the amount of about 60-75% by weight.

12. As a new article of manufacture, a pressure sensitive adhesive tape or the like comprising a backing of regenerated cellulose provided with a normally pressure-sensitive adhesive including chlorinated rubber in an amount of about 35-60% by weight and dibutyl phthalate in an amount of about 40-65% by weight.

13. As a new article of manufacture, a pressure sensitive adhesive tape or the like which comprises a backing of a rubber hydrochloride provided with a normally pressure-sensitive adhesive including chlorinated rubber in an amount of about 40-65% by weight and butyl stearate in an amount of about 35-60% by weight.

14. An adhesive sheet or tape comprising a flexible non-fibrous backing of organic material having an adhesive coating united thereto, said adhesive coating being comprised of halogenated rubber and a non-drying tack-producing plasticizer compounded in proportions such that the adhesive coating is normally non-offsetting, tacky and pressure-sensitive.

15. An adhesive sheet or tape comprising a flexible non-fibrous cellulosic backing having an adhesive coating united thereto, said adhesive coating being comprised of halogenated rubber and a non-drying tack-producing plasticizer compounded in proportions such that the adhesive coating is normally non-offsetting, tacky and pressure-sensitive.

16. An adhesive sheet or tape having a flexible backing coated with an adhesive comprised of a chlorinated rubber containing about 66% chlorine and a non-drying tack-producing plasticizer in amount to cause the adhesive to be normally non-offsetting, tacky and pressure-sensitive.

CLAUSS BURKART STRAUCH.